(12) United States Patent
Fischer (10) Patent No.: US 9,183,305 B2
(45) Date of Patent: Nov. 10, 2015

(54) DELEGATED SEARCH OF CONTENT IN ACCOUNTS LINKED TO SOCIAL OVERLAY SYSTEM

(75) Inventor: Donald F. Fischer, Charlestown, MA (US)

(73) Assignee: Red Hat, Inc., Raleigh, NC (US)

( * ) Notice: Subject to any disclaimer, the term of this patent is extended or adjusted under 35 U.S.C. 154(b) by 978 days.

(21) Appl. No.: 11/765,288

(22) Filed: Jun. 19, 2007

(65) Prior Publication Data

US 2008/0319943 A1  Dec. 25, 2008

(51) Int. Cl.
*G06F 17/30* (2006.01)

(52) U.S. Cl.
CPC .... *G06F 17/30867* (2013.01); *G06F 17/30554* (2013.01)

(58) Field of Classification Search
CPC .................................................. G06F 17/30554
USPC ......................................................... 707/732
See application file for complete search history.

(56) References Cited

U.S. PATENT DOCUMENTS

| | | | |
|---|---|---|---|
| 6,493,703 B1 * | 12/2002 | Knight et al. | |
| 6,778,982 B1 * | 8/2004 | Knight et al. | |
| 6,847,969 B1 * | 1/2005 | Mathai et al. | |
| 7,725,453 B1 * | 5/2010 | Chen et al. | 707/711 |
| 7,873,572 B2 | 1/2011 | Reardon | |
| 7,987,185 B1 * | 7/2011 | Mysen et al. | 707/733 |
| 8,010,458 B2 | 8/2011 | Galbreath et al. | |
| 8,082,242 B1 * | 12/2011 | Mysen et al. | 707/711 |
| 8,442,994 B1 * | 5/2013 | Chen et al. | 707/781 |
| 2002/0156635 A1 * | 10/2002 | Nils | 704/270.1 |
| 2002/0165936 A1 * | 11/2002 | Alston et al. | 709/217 |
| 2005/0097089 A1 * | 5/2005 | Nielsen et al. | 707/3 |
| 2005/0144158 A1 * | 6/2005 | Capper et al. | 707/3 |
| 2005/0216457 A1 * | 9/2005 | Walther et al. | 707/4 |
| 2006/0026147 A1 * | 2/2006 | Cone et al. | 707/3 |
| 2006/0031197 A1 * | 2/2006 | Oral et al. | 707/3 |

(Continued)

OTHER PUBLICATIONS

USPTO, Notice of Allowance for U.S. Appl. No. 11/564,986 mailed Oct. 22, 2013.

(Continued)

*Primary Examiner* — James Trujillo
*Assistant Examiner* — Kurt Mueller
(74) *Attorney, Agent, or Firm* — Lowenstein Sandler LLP (57) ABSTRACT

The present invention provides a federated search tool and search methods that consolidate searches to external online accounts of a user and other people that are part of the user's social network. In some embodiments, the search tool is presented as a single search box that may appear persistently on the user's desktop display or as a toolbar embedded within another application. The search tool may be embedded as part of web page. Embodiments of the present invention may provide the results in a simple real-time display stack or a static result list, such as a web page. Blocks in the stack may indicate a result and the context of the result, such as which online account originated the result, whether the result is from a linked external accounts of people associated with the user, pointers to people and groups the user has linked to, an age of the result, and the like. The present invention may also permit the user to search the Internet generally, such as well known search engines, and to search the contents of their local machine, such as documents, emails, pictures, and the like. In addition, the present invention allows searches to be performed asynchronously to various linked external online account sites and then provides these results as they arrive.

23 Claims, 5 Drawing Sheets

(56) References Cited

U.S. PATENT DOCUMENTS

| | | | |
|---|---|---|---|
| 2006/0031198 A1* | 2/2006 | Newbold et al. | 707/3 |
| 2006/0053092 A1* | 3/2006 | Foo et al. | 707/3 |
| 2006/0122979 A1* | 6/2006 | Kapur et al. | 707/3 |
| 2006/0282416 A1* | 12/2006 | Gross et al. | 707/3 |
| 2007/0124401 A1* | 5/2007 | Gillespie et al. | 709/206 |
| 2007/0198485 A1* | 8/2007 | Ramer et al. | 707/3 |
| 2008/0005064 A1 | 1/2008 | Sarukkai | |
| 2008/0010294 A1* | 1/2008 | Norton et al. | 707/10 |
| 2008/0015878 A1* | 1/2008 | Feng et al. | 705/1 |
| 2008/0133495 A1 | 6/2008 | Fischer | |
| 2008/0194233 A1* | 8/2008 | Henry | 455/411 |
| 2008/0215623 A1* | 9/2008 | Ramer et al. | 707/104.1 |
| 2008/0235187 A1* | 9/2008 | Gade et al. | 707/3 |
| 2009/0063448 A1* | 3/2009 | DePue et al. | 707/5 |
| 2013/0218863 A1* | 8/2013 | Skillen et al. | 707/707 |

OTHER PUBLICATIONS

USPTO, Office Action for U.S. Appl. No. 11/564,986 mailed Aug. 10, 2009.

USPTO, Final Office Action for U.S. Appl. No. 11/564,986 mailed Mar. 9, 2010.

USPTO, Advisory Action for U.S. Appl. No. 11/564,986 mailed Jun. 23, 2010.

USPTO, Office Action for U.S. Appl. No. 11/564,986 mailed Jul. 27, 2010.

USPTO, Final Office Action for U.S. Appl. No. 11/564,986 mailed Apr. 8, 2011.

USPTO, Advisory Action for U.S. Appl. No. 11/564,986 mailed Jun. 15, 2011.

USPTO, Office Action for U.S. Appl. No. 11/564,986 mailed Jul. 18, 2011.

USPTO, Final Office Action for U.S. Appl. No. 11/564,986 mailed Dec. 12, 2011.

USPTO, Office Action for U.S. Appl. No. 11/564,986 mailed Apr. 20, 2012.

USPTO, Final Office Action for U.S. Appl. No. 11/564,986 mailed Sep. 12, 2012.

USPTO, Office Action for U.S. Appl. No. 11/564,986 mailed Apr. 30, 2013.

* cited by examiner

DELEGATED SEARCH OF CONTENT IN ACCOUNTS LINKED TO SOCIAL OVERLAY SYSTEM

DESCRIPTION OF THE INVENTION

1. Field of the Invention

The invention relates generally to searching of data sources.

2. Background of the Invention

Individual search engines have facilitated the access to data published on networks such as the Internet or intranets. However, individual search engines are subject to certain limitations, and this has resulted in the creation of federated search engines that exploit other information sources, including individual search engines, in order to provide a better answer to user queries. Federated search engines do not store a document collection; instead, federated search engines forward user queries to external information sources in order to retrieve relevant data using wrappers that specify the interaction with information sources.

Unlike individual search engines, federated search engines (or meta search engines or aggregated search engines) attempt to provide a single user interface for accessing multiple information sources that vary in content. These search engines hope to achieve better results by widening the domains of their search.

However, this approach increases the amount of information a search may uncover. Similar to individual search engines, federated search engines need to distill search results in a concise and coherent manner so that users may readily identify what they are looking for. Many search engines distill search results for a user by computing a score using preset criteria and ranking the search results based on the computed score. In addition, search engines help users locate information in search results they are looking for by clustering search results into groups or categories based on the characteristics of the search results.

However, these known advances generally still fail to provide search results to users that they are truly trying to locate or that they are interested. Moreover, the known federated search engines and the like still fail to provide search results that account for the user's perspective of their online services. For example, known federated search engines focus only on publicly available results and yet fail to obtain results in online services where the user is authorized to access.

Accordingly, it would be desirable to provide methods and system of search that efficiently provide results of interest to the user. In addition, it would be desirable to provide methods and systems of search that take into account the user's relationships with their online services and with other users of those online services.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention provides a federated search tool and search methods that consolidate searches to external online accounts of a user and other people that are part of the user's social network. In some embodiments, the search tool is presented as a single search box that may appear persistently on the user's desktop display or as a toolbar embedded within another application. The search tool may be embedded as part of web page. Embodiments of the present invention may provide the results in a simple real-time display stack or a static result list, such as a web page. Blocks in the stack may indicate a result and the context of the result, such as which online account originated the result, whether the result is from a linked external accounts of people associated with the user, pointers to people and groups the user has linked to, an age of the result, and the like. The present invention may also permit the user to search the Internet generally, such as well known search engines, and to search the contents of their local machine, such as documents, emails, pictures, and the like. In addition, the present invention allows searches to be performed asynchronously to various linked external online account sites and then provides these results as they arrive.

Reference will now be made in detail to the exemplary embodiments of the invention, which are illustrated in the accompanying drawings. Wherever possible, the same reference numbers will be used throughout the drawings to refer to the same or like parts.

Figure 1:
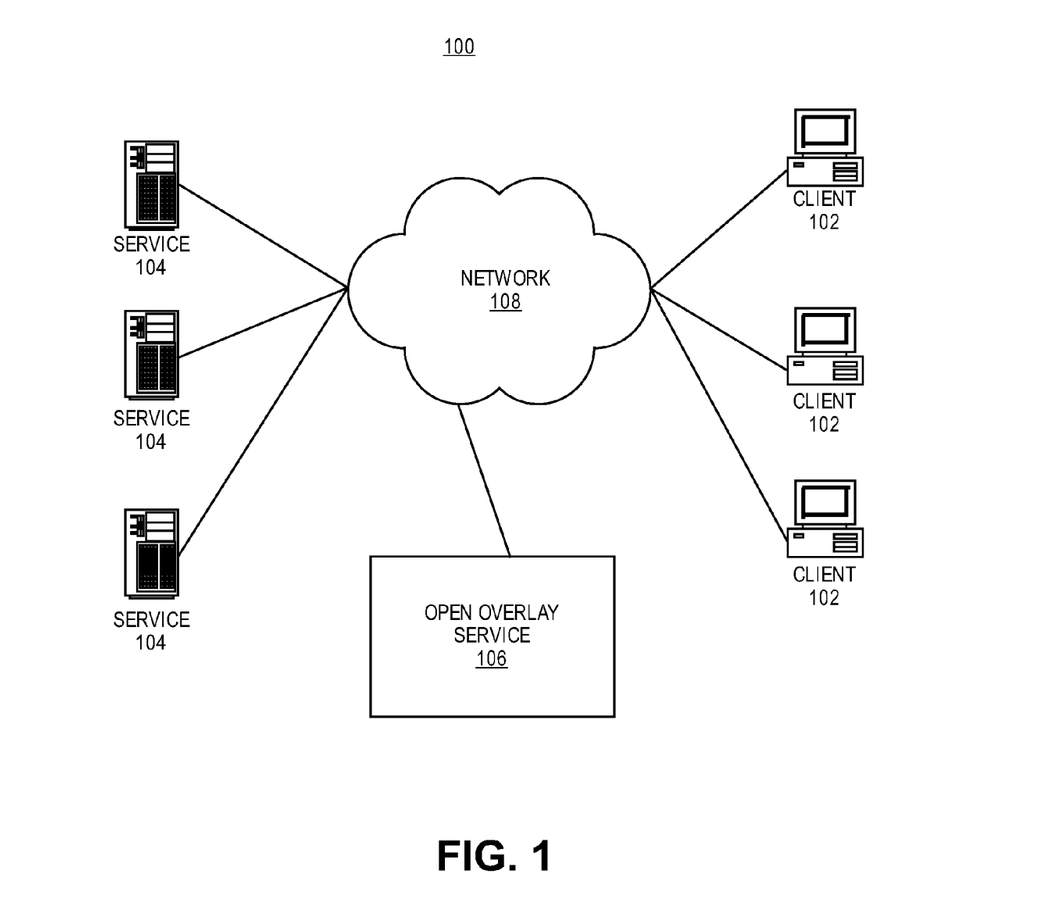
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use.

Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to search for and retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
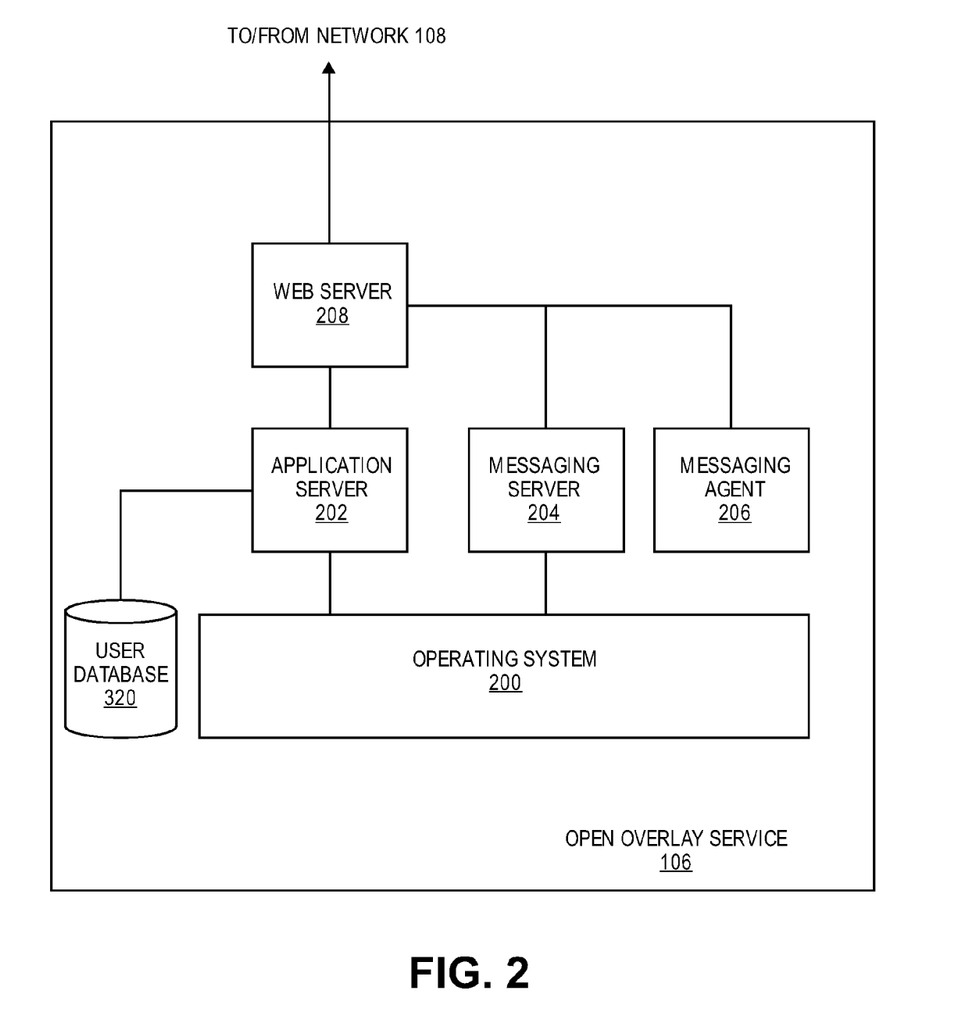
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for information, content, and other users based on various criteria, such as keywords, age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Figure 3:
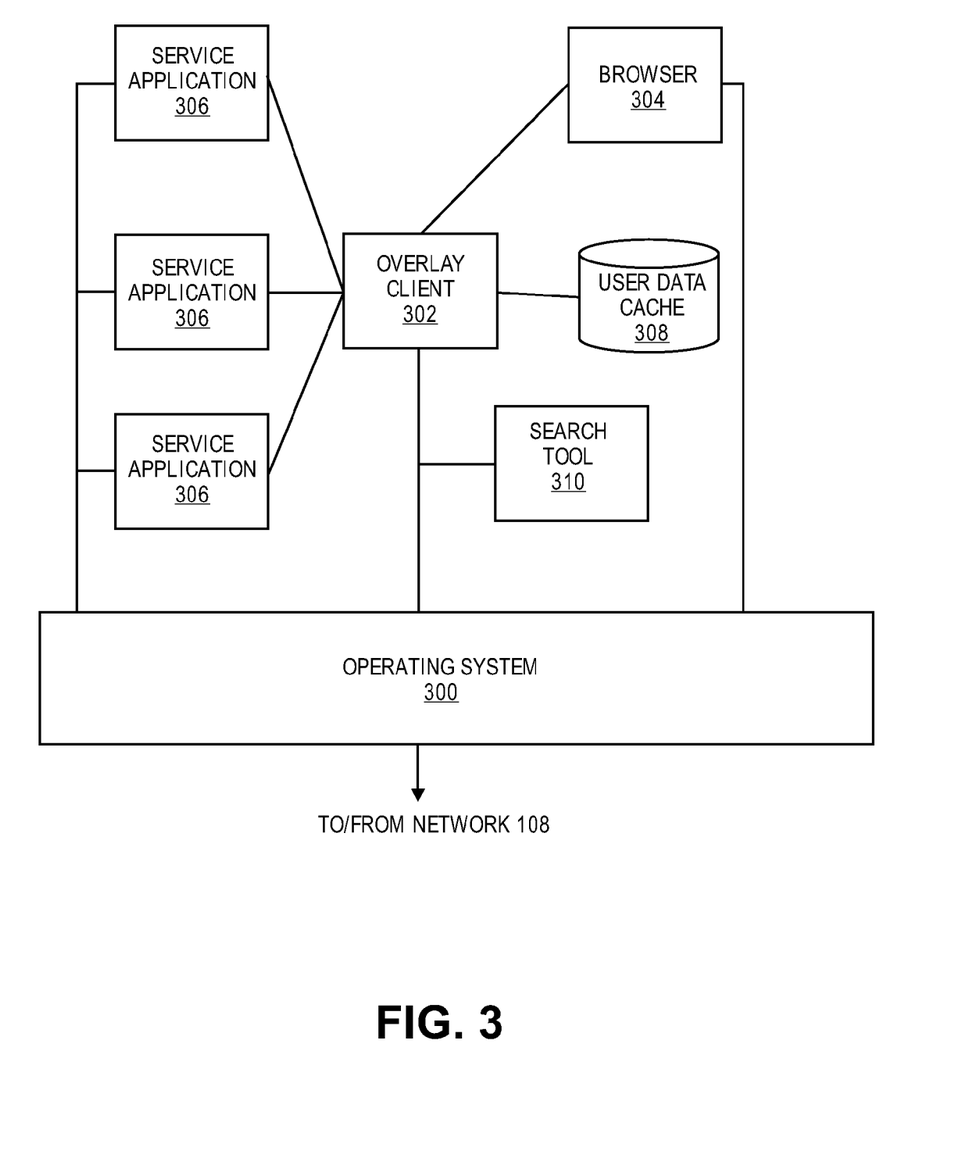
FIG. 3 illustrates an exemplary architecture for clients that are consistent with the principles of the present invention.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

In addition, in order to support queries to online services 104, messaging server 204 may employ plugins that format a search query in to a form suitable for different search engines. Such plugins are known to those skilled and the art. For example, messaging server may employ a plugin for a Universal Description, Discovery and Integration (UDDI) compliant online service. UDDI is an extensible markup language (XML) based registry for entities to list themselves on the Internet. UDDI is an open industry initiative that is sponsored by OASIS and is well known to those skilled in the art.

Messaging server 204 evaluates the response and determines if a notification event is needed. If notification is needed, messaging server 204 send a message to overlay client 302. The notification may then be displayed to the user using, for example, browser 304 or service application 306. For example, messaging server 204 may send notification event to report when search results have been received.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, a user data cache 308, and a search tool 310. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like. User data cache 308 may also store a history of previous searches, search results, and the like.

Search tool 310 represents the software for graphical user interface that, when clicked, will activate a federated search on behalf of the user. The user may modify and customize search tool 310 to fit their personal needs. In general, search tool 310 is configured to receive a search request from the user, such as the entry of a set of keywords, and activate the federated search. Of course, search tool 310 may provide a range of options in specifying a federated search. Such options are well known to those skilled in the art.

In one embodiment, search tool 310 operates as a thin client operates in conjunction with open overlay service 106 to perform a federated search. For example, a user may interface with open overlay service 106 as web application or web page via web browser 208. As part of open overlay service 106, search tool 310 may be embedded as part of the web application or web page or as a toolbar on web browser 208. For example, search tool 310 may be implemented as a Java applet that interfaces with a corresponding servlet running on application server 202 to perform a federated search. In this embodiment, open overlay 106 performs most of the functions to accomplish the federated search. Nonetheless, whether operating as thin client or as a full client, both are capable of providing a federated search consistent with the present invention.

In another embodiment, search tool 310 operates as a client and performs more of the tasks for a federated search. Search tool 310 may be implemented as a toolbar appearing on client 102. The user may still modify and customize search tool 310 to fit their personal needs. Search tool 310 configured as a full client application is explained in more detail with reference to FIG. 4.

In general, search tool 310 is configured to perform a federated search and provide results from the user's point of view in the various social networks via open overlay service 106. Results provided from search tool 310 have some contextual information, such as who sent a web swarm and how old it is, or whose account originated a result.

Search tool 310 may be initiated by receiving a set of keywords from a user. In response, the search tool 310 identifies a domain of online services of the user based on the user's account information with online services 104. Search tool 310 then queries or requests queries to at least some of the online services based on the set of keywords received from the user. The results are eventually provided in a format that indicates results from the online services and their context from the user's point of view as will be described below. The results may be presented via an application running on client 102 or embedded via a web page displayed by browser 304.

The various structures of search tool 310 that may be used in the present invention will now be described with reference to FIG. 4.

Figure 4:
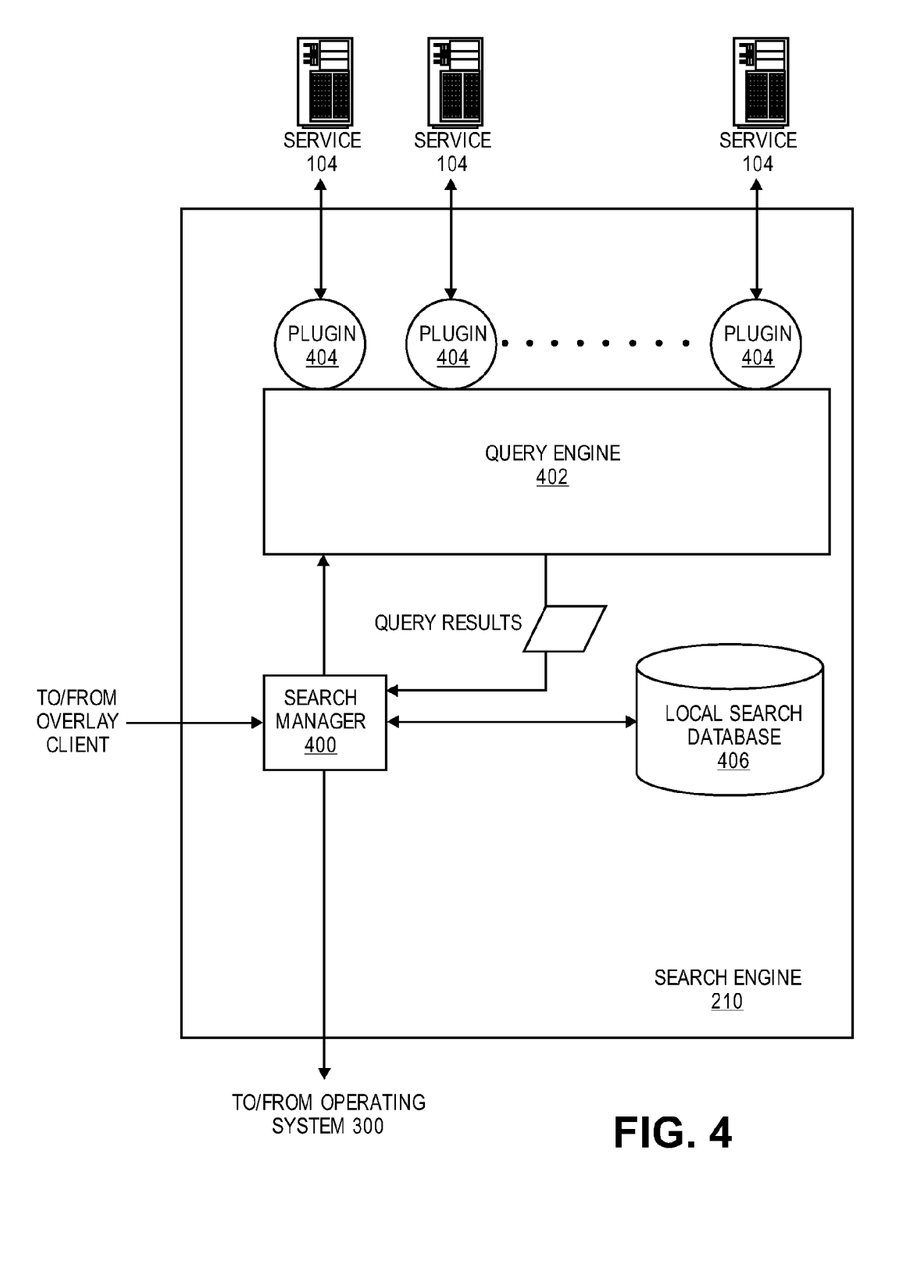
FIG. 4 illustrates an exemplary architecture for a search tool in accordance with the present invention.

FIG. 4 illustrates an exemplary architecture for search tool 310 as a client application running on client 102. As shown, search tool 310 may comprise a search manager 400, a query engine 402 utilizing plugins 404 and a local cache 406. These components will now be further described.

Search manager 400 is the software responsible for receiving the search request, initiating multiple queries, collecting the results, and providing these results to the user. Search manager 400 may interface with overlay client 302 to pull together pointers to the external accounts of the user with online services 104 and those of people known to the user. Search manager 400 uses this information to determine a domain of online services 104 against which the search will be performed. In addition, search manager 400 will be able to conduct the federated search using the online account credentials of the user it's gathered. Thus, unlike conventional federated search engines, the present invention is able to search from the point of view of the user and not just be limited to public information.

For example, with this feature search manager 400 may obtain results from external accounts the user linked to open overlay service 106, from linked external accounts of people known to the user, and pointers to people and groups the user linked to on open overlay service 106.

Furthermore, search manager 400 may supplement these searches with other conventional searches, such as web search results from Internet search engines like Yahoo! or Google and local search results from resources stored on client 102. Search manager 400 may implement these conventional searches directly or may interface with known tools, such as Google's desktop search, to perform these searches.

Search manager 400 is thus able to provide search results oriented from the point of view of the users based on their relationships with the various social networks and other users of those social networks. In providing results, search manager 400 may provide some contextual information similar, such as who originated the result, how old it is, or whose account originated some activity.

In addition, search manager 400 may initiate its searches asynchronously from each other. For example, search manager 400 may trigger asynchronous searches to the various linked external account sites and provide the results to the user as they arrive from these sites.

Search manager 400 may also filter the results based on various criteria. For example, the user may specify a set of defaults with search manager 400 that are used to filter the results. Of course, other filtering technologies are known to those skilled in the art.

Query engine 402 is responsible for routing queries for the federated search to the appropriate information sources, such as online services 104, translate the queries into an appropriate format, and send the queries to the appropriate information source, for example, via network 108.

Plugins 404 are software that assist query engine 402 interact with the various information sources that are the subject of the federated search. For example, plugins 404 may implement an application programming interface to format a query into a particular format or language. This is because various information sources may use different formats and syntax for accepting a query. Plugins 404 may also, if needed, employ services of overlay client 302 and service applications 306 in order to fully access an information source, such as one or more of online services 104.

Local cache 406 serves as a storage location for search engine 310. For example, search engine 310 may utilize local cache 406 to store a history searches, keywords, results, and the like.

Figure 5:
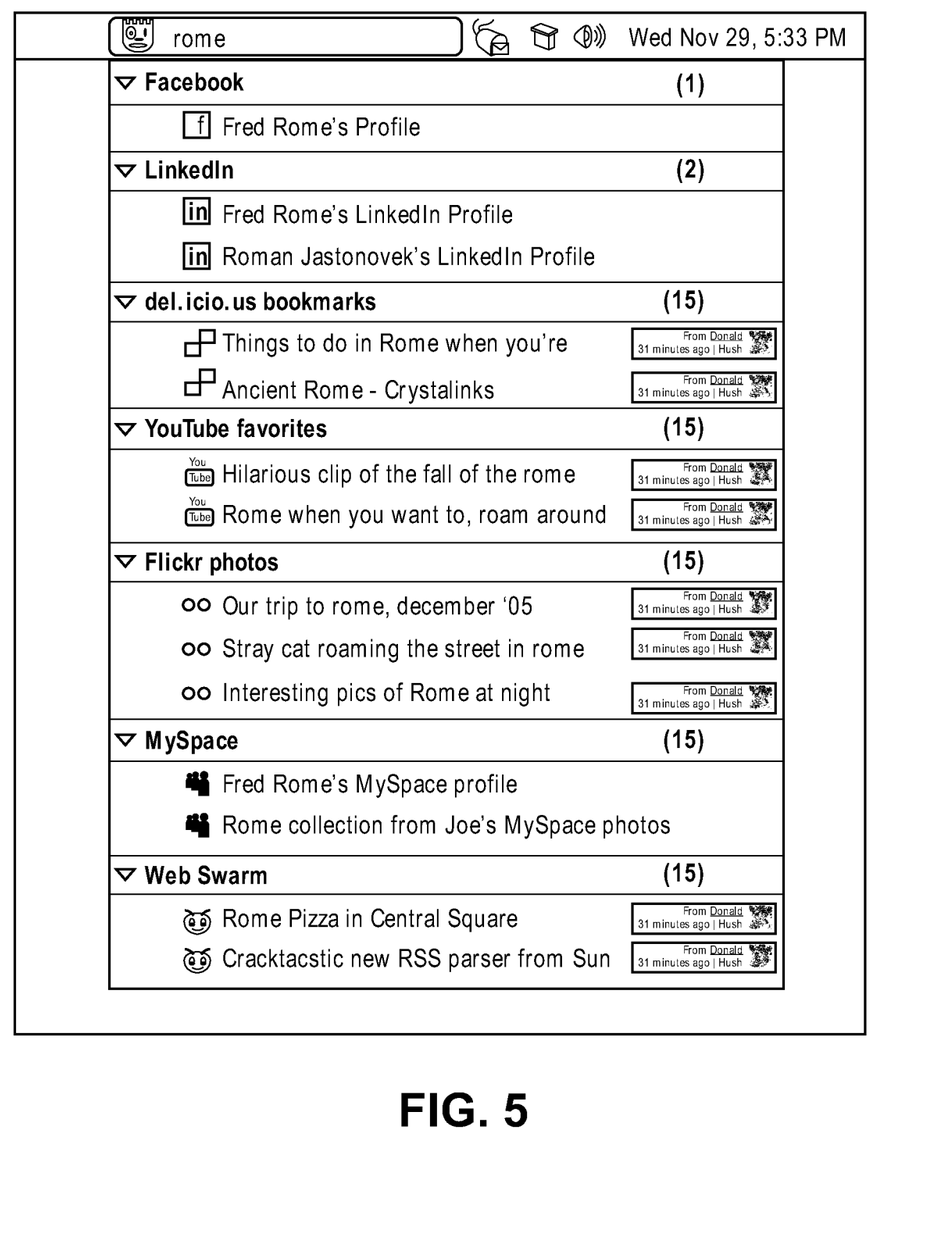
FIG. 5 illustrates an exemplary screen shot demonstrating how the present invention may present results of a search.

In order to illustrate some of the features of search tool 310, FIG. 5 is now provided to illustrate a search result stream. As shown, the search result stream may be a dynamic display provided to a user that indicates various results in a "stacked" format as they arrive or in batches. As noted, the search result stream may be provided by search tool 310, or embedded in a web page displayed by browser 304.

Each block of the stacked format represents one or more results originating from the user's own activities or activities of the user's contacts in their social network. Activities may originate from accounts on other online service that the user linked to their profile on open overlay service 106. The stacked format of the results event stream may be updated in substantially real time to provide the user a sense of the progression of their federated search.

In general, the results event stream aggregates a wide variety of information collected by search tool 310. For example, the results event stream indicate events, such as results originating from an Internet web feed (e.g., a RSS feed), and results that are links to music on specific sites of network 108, such as iTunes. In addition, events indicated in the results event stream may comprise: results corresponding to songs; results corresponding to videos; results corresponding to Internet content ranked or bookmarked by users; results corresponding to explicit shares of content between users of social networks of open overlay service 106; results reflecting activity across a diversity of online web sites and services; results representing activity by a particular person or user; results representing activity by friends of a particular person or user; results representing activity associated with a group; or events representing activity by members of a group.

The results event stream may also provide various options and information including: an option to add an entry to a user's "favorites"; information showing when the result was created or updated; an expand/contract each block; an option to highlight one or more blocks in the stream; an ability to scroll back through history of the blocks; an option to chat or join a chat about a result; information, such as an image or name, of person or group that originated the result in a block; or an icon dynamically retrieved to represent the origin of the result in the block, such as a website or online service or company.

In some embodiments, the blocks in the results event stream may be repeated or ordered based on the popularity of the result in that block. A user may also selectively filter blocks (e.g., "hush") in the display, either individually, by group, by type, etc.

The results event stream thus allows search tool 310 searches from the point of view of the user's various accounts (e.g., Flickr, YouTube, digg, and delicious) on different systems.

Blocks of the results event stream may include various details and may be updated in a cascading format. As shown, each block provides a thumbnail view of a social network by representing a user on open overlay 106 and a result is represented in that block.

In order to provide visual effect, the size of the blocks in the results event stream may be modified to indicate relative activity. For example, a large block may indicate a high amount of recent activity while smaller blocks may indicate decreased activity.

In addition, initial blocks are smaller in size, but can be expanded to get a more complete view of the detail and its activity. Activity, such as views of a link swarming, may cause a block on the results event stacker to rise to the top.

As explained herein, for example as shown in FIGS. 2-4, certain embodiments may include storage of programs and/or data on a well-known computer readable medium. Exemplary well-known computer readable storage media include conventional computer system RAM (random access memory), ROM (read-only memory), EPROM (erasable, programmable ROM), EEPROM (electrically erasable, programmable ROM), and magnetic or optical disks or tapes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
receiving a set of keywords from a user subscribed to one or more social networking services, wherein the user has one or more personalized profiles in the one or more social networking service;
searching, by a hardware processor, one or more accounts of the user in the one or more social networking services in view of the set of keywords received from the user and the one or more personalized profiles of the user in the one or more social networking services;
associating, by the hardware processor, federated search results with the one or more social networking services;
generating a results events stream comprising one or more blocks, each of the one or more blocks comprising information about the federated search results from the one or more social networking services;
assigning a unique identifier to the user;
associating the unique identifier to an identity resource;
displaying the results events stream, a name of the user and the identity resource associated with the user in view of the unique identifier;
determining an activity level of each of the one or more blocks;
modifying a size of each of the one or more blocks in view of the activity level; and
displaying the one or more modified blocks.

2. The method of claim 1, wherein the federated search results comprises information embedded in a web page.

3. The method of claim 1, further comprising searching one or more search engines in view of the set of keywords received from the user.

4. The method of claim 1, further comprising searching information stored on a client machine in view of the set of keywords.

5. The method of claim 1, further comprising searching the one or more accounts of the user asynchronously.

6. The method of claim 1, wherein the federated search results comprises a format that indicates contextual information associated with the one or more social networking services.

7. The method of claim 1, wherein the federated search results comprises a format that indicates persons associated with the federated search results.

8. The method of claim 1, wherein the federated search results comprises a format that indicates respective ages of the results.

9. The method of claim 1, wherein the federated search results comprises a format that indicates the one or more personalized profiles of the user in the one or more social networking services.

10. The method of claim 1, wherein the search results are asynchronously in view of when the federated search results are provided from the one or more social networking services.

11. The method of claim 1, wherein the federated search results are in a real-time stacked display that indicates the federated search results as they are received, wherein the real-time stacked display comprises blocks that comprise information about the federated search results and context about the federated search results.

12. A system comprising:
an open overlay service to interface with one or more social networking services, wherein a user is subscribed to the one or more social networking services, and wherein the user has one or more a personalized profiles in the one or more social networking services; and
a client device to:
receive a set of keywords from the user,
access the one or more social networking services of the one or more social networking services to search one or more accounts of the user in the one or more social networking services in view of the set of keywords received from the user and the one or more personalized profiles of the user in the one or more social networking services,
associate federated search results with the one or more social networking services,
generate a results events stream comprising one or more blocks, each of the one or more blocks comprising information about the federated search results from the one or more social networking services,
assign a unique identifier to the user;
associate the unique identifier to an identity resource;
display the results events stream, a name of the user and the identity resource associated with the user in view of the unique identifier;
determine an activity level of each of the one or more blocks;
modify a size of each of the one or more blocks in view of the activity level; and
display the one or more modified blocks.

13. The system of claim 12, wherein the one or more social networking services comprises one or more search engines.

14. The system of claim 12, wherein the client device is further to asynchronously search the one or more accounts of the user.

15. The system of claim 12, wherein the client device is further to sort the results in view of where the results originated and a context of the results.

16. The system of claim 12, wherein the client device is further to sort the results in view of a history of activities of the user.

17. An apparatus comprising:
a module to interface with an open overlay service to interface with one or more social networking services, wherein a user is subscribed to the one or more social networking services, and wherein the user has one or more personalized profiles in the one or more social networking services;
a user interface to receive a set of keywords from the user; and
a query engine executable by a processor to:
access the one or more social networking services to search one or more accounts of the user in the one or more social networking services in view of the set of keywords received from the user and the one or more personalized profiles of the user in the one or more social networking services of the one or more social networking services,
associate federated search results with the one or more social networking services,
generate a results events stream comprising one or more blocks, each of the one or more blocks comprising information about the federated search results from the one or more social networking services,
assign a unique identifier to the user;
associate the unique identifier to an identity resource;
display the results events stream, a name of the user, and the identity resource associated with the user in view of the unique identifier;
determine an activity level of each of the one or more blocks;
modify a size of each of the one or more blocks in view of the activity level; and
display the one or more modified blocks.

18. The apparatus of claim 17, wherein the user interface is further to provide the results in a real-time stacked display that indicates the results as they are received from the query engine, wherein the real-time stacked display comprises blocks that comprise information about the results and context about the results.

19. The apparatus of claim 17, wherein the query engine is further to search one or more search engines in addition to the one or more accounts of the user.

20. The apparatus of claim 17, wherein the query engine is further to asynchronously search the one or more accounts of the user.

21. The apparatus of claim 17, wherein the query engine is further to search data stored on a client device in view of the set of keywords.

22. A non-transitory computer-readable storage medium including instructions that, when executed by a hardware processor, cause the hardware processor to:
receive a set of keywords from a user subscribed to one or more social networking services, wherein the user has one or more personalized profiles in the one or more social networking services;
search, by the hardware processor, one or more accounts of the user in the one or more social networking services in view of the set of keywords received from the user and the one or more personalized profiles of the user in the one or more social networking services;
associate, by the hardware processor, federated search results with the one or more social networking services;
generate a results events stream comprising one or more blocks, each of the one or more blocks comprising information about the federated search results from the one or more social networking services;
assign a unique identifier to the user;
associate the unique identifier to an identity resource;
display the results events stream, a name of the user and the identity resource associated with the user in view of the unique identifier;
determine an activity level of each of the one or more blocks;
modify a size of each of the one or more blocks in view of the activity level; and
display the one or more modified blocks.

23. The non-transitory computer-readable storage medium of claim 22, wherein the federated search results comprises information embedded in a web page.

* * * * *